United States Patent
Yet

(10) Patent No.: US 6,448,966 B1
(45) Date of Patent: Sep. 10, 2002

(54) METHOD FOR IMPROVING 3D COMPUTER GRAPHIC PERFORMANCE BY PRE-SORTING

(75) Inventor: Kwo-Woei Yet, Miao-Li Hsien (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 266 days.

(21) Appl. No.: 09/613,978

(22) Filed: Jul. 11, 2000

(51) Int. Cl.$^7$ ............................................... G06T 17/00
(52) U.S. Cl. ...................................................... 345/421
(58) Field of Search ................................ 345/418, 419, 345/420, 421, 422, 426, 427, 428, 581

(56) References Cited

U.S. PATENT DOCUMENTS

| | | | |
|---|---|---|---|
| 5,931,913 A | 8/1999 | Meriwether et al. | 709/227 |
| 5,958,013 A | 9/1999 | King et al. | 709/227 |
| 6,222,550 B1 * | 4/2001 | Rossman et al. | 345/419 |
| 6,229,553 B1 * | 5/2001 | Guluk, Jr. et al. | 345/419 |
| 6,246,415 B1 * | 6/2001 | Grossman et al. | 345/421 |
| 6,326,964 B1 * | 12/2001 | Snyder et al. | 345/419 |
| 6,362,818 B1 * | 3/2002 | Gardiner et al. | 345/421 |

* cited by examiner

*Primary Examiner*—Cliff N. Vo
(74) *Attorney, Agent, or Firm*—Senniger, Powers, Leavitt & Roedel

(57) ABSTRACT

The present invention discloses a method for improving 3D computer graphics by pre-sorting display lists or display primitives. The display lists or display primitives with smaller indicators are placed at the front end of a reordered region, and the display lists or display primitives with larger indicators are placed at the rear end of the reordered region. The indicators are the minimum, average or maximum values computed with the depth values, or even be the depth values by themselves. After a sorting action is finished, the method of the present invention will enter a Z-buffer pre-test process. Because the display lists or display primitives have been sorted from the lowest to the largest depth valves, the probability of skipping hidden pixels in the Z-buffer pre-test process will be increased and the unnecessary computations of hidden pixels will be reduced in the rendering process.

5 Claims, 4 Drawing Sheets

METHOD FOR IMPROVING 3D COMPUTER GRAPHIC PERFORMANCE BY PRE-SORTING

BACKGROUND OF THE INVENTION

1. Field of the Invention

The present invention relates to a method for improving 3D computer graphic performance, particularly to a method which pre-sorts display lists or display primitives according to their depth values and then discards invalid pixels through a Z-buffer pre-test process.

2. Description of the Related Art

Referring to FIG. 1, a well-known 3D computer graphic display system includes a host interface 11, a display memory 12, a memory controller 13, a 3D graphic controller 14, a screen controller 15 and a screen 16. The host interface 11, such as a well-known AGP bus, is used to receive control signals from a CPU (not shown) and be an interface of bi-directional transmission of all video data between the CPU and the 3D graphic controller 14. The graphic controller 14 is the most important element in the graphic system, and is used to generate all video data which the computer graphic display system needs. The 3D graphic controller 14 utilizes a memory controller 13 to control the display memory 12 in read/write cycles, and utilizes a screen controller 15 to control the display of the screen 16. The display memory 12 is utilized to store the video data displayed on the screen 16.

All the video data of a display frame shown on the screen 16 are represented by a plurality of objects, and sometimes the plurality of objects will overlap each other. In a transparently rendering process, also called "alpha-blending rendering process," all the objects overlapped at the same position are displayed simultaneously. In a non-transparently rendering process, only the object appearing on the top, that means the closest object to human eyes, will be displayed. In other words, all objects situated under the top object will be hidden. FIG. 2 is a flow chart of a well-known Z-buffer pre-test process in a 3D computer graphics. The Z-buffer pre-test process is used to discard invalid pixels in the 3D computer graphic system and to store the smallest depth value $Z_b$ among all pixels having been inputted. The smaller the depth value of an object is, the more the object is close to human eyes, that means the object with the smaller depth value is on the upper layer of the overlapped objects. The flow of the Z-buffer pretest process starts in step 21, that means a rendering process is started to execute. In step 22, the flow reads the depth value $Z_i$ of an input pixel being executed and a depth value $Z_b$ stored in the Z buffer. In step 23, $Z_b$ and $Z_i$ are compared to determine if the input pixel being executed is going to be displayed or discarded. If $Z_b$ is less than $Z_i$, that represents the input pixel being executed is on the lower layer of the overlapped objects, step 24 is then executed. In step 24, the input pixel being executed is discarded, and repeats step 22. If $Z_b$ is larger than $Z_i$ in step 23, that represents the input pixel being executed is on the top layer of the overlapped objects, step 25 is then executed. In step 25, the flow replaces the depth value in the Z buffer with the depth value of the input pixel being executed, and then continues to execute other validity tests, such as a scissor test, stencil test, and so on. If the pixel passes all validity tests, it will be displayed later, and the flow ends in step 26.

If the pixels on the lower layer (invalid pixel) appear earlier than the pixels on the upper layer does, the invalid pixels would not be discarded in the Z-buffer pre-test process. When the pixels on the upper layer appears later, the invalid pixel having been shown will therefore be discarded in the Z-buffer pre-test process. Because the above-mentioned situation happens, the computer graphic display system will execute one or more memory access actions. Therefore, a lot of system resources are wasted and the executing speed is therefore slowed down.

SUMMARY OF THIS INVENTION

The object of the present invention is to eliminate the drawbacks of wasting system resources due to accessing invalid pixels in prior art. To this end, the present invention provides a method for improving 3D computer graphic performance by pre-sorting. The method separates a plurality of display lists forming a display frame into static regions and reordered regions according to whether a transparently rendering process is executed or not. The display lists in the reordered region are sorted from the lowest to the largest according to their indicators representing the depth values of all display primitives of one display list. The display list with smaller indicator is placed at the front end of the reordered region, and the display list with larger indicator is placed at the rear end of the reordered region. The display lists in the static region are not executed the sorting action. After the sorting action is finished, the flow will enter a Z-buffer pre-test process. Because the display lists have been sorted from the lowest to the largest according to the indicators, the probability of accessing invalid pixels will be reduced, system resources will be largely eliminated and the display-ing speed of video data will be speeded up.

The present invention mainly comprises steps (a) to (f). In step (a), the depth values of all display primitives of a display list are read, and an indicator to represent said depth values is computed. In step (b), if the display list is the last one in the display frame or if the region after the display list is a static region is checked. In step (c), if the answer of step (b) is no, the indicator is stored in the reordered region, and step (a) is then executed. In step (d), if the answer of step (b) is yes, the plurality of display lists are sorted according to the indicators, and being stored later. In step (e), if the display list is the last one in the display frame is checked.

In step (f), if the answer of step (e) is no, step (a) is executed; otherwise, the method of the present invention is finished.

Another method of the present invention is to represent the video data in the display frame directly with the plurality of display primitives. Because the depth values of all display primitives of a display list will not always be the same, the indicator of the display list can just approximate the depth values of all display primitives, but still create errors. If the video data in the display frame is represented with the plurality of display primitives directly, the indicator is unnecessary to compute again, and the errors would be avoided. The disadvantage of representing the display frame directly with the plurality of display primitives is to create more hardware cost.

If using a plurality of display primitives to form video data of a display frame, the present invention mainly comprises steps (a) to (f). In step (a), a depth value of a display primitive is read. In step (b), if the display primitive is the last one in the display frame or if the region after the display primitive is a static region is checked. In step (c), if the answer of step (b) is no, the depth value is stored in the reordered region, and step (a) is executed. In step (d), if the answer of step (b) is yes, the plurality of display primitives are sorted according to the depth values, and stored later. In step (e), if the display primitive is the last one in the display frame is checked. In step (f), if the answer of step (e) is no, step (a) is executed; otherwise, the method of the present invention is finished.

The present invention can be implemented by either software or hardware, and there are no limits on that. Because the present invention has the advantages of simple structure and less operations, no matter what kind of implementations has the advantages mentioned above.

BRIEF DESCRIPTION OF THE DRAWINGS

This invention will be described according to the accompanying drawings in which.

PREFERRED EMBODIMENT OF THE INVENTION

Figure 3:
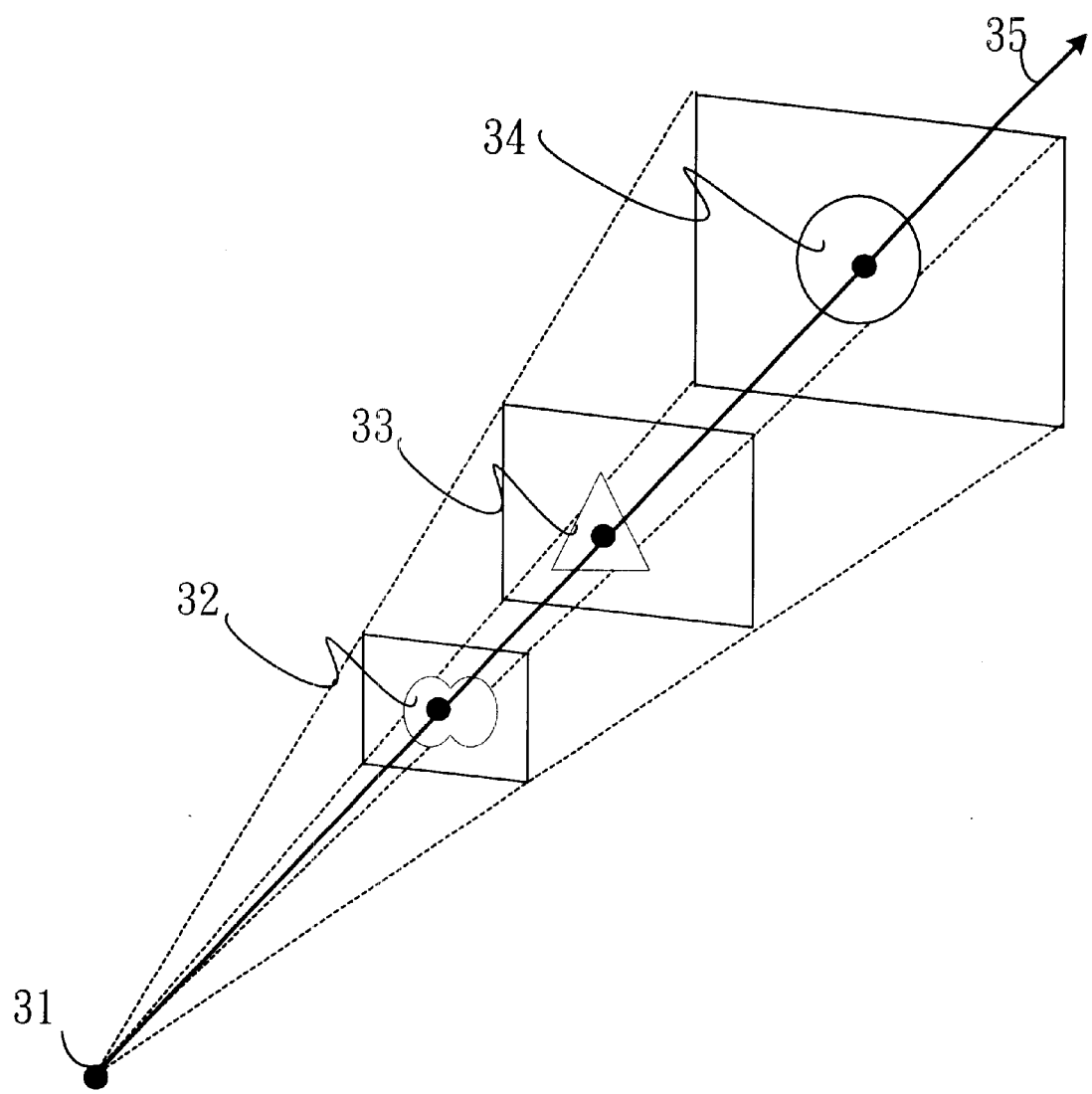
FIG. 3 is a schematic diagram of overlapped objects in a 3D computer graphics.

FIG. 3 is a schematic diagram of overlapped objects in a 3D computer graphics. For a line of vision 35 from an observation point 31, three objects 32, 33 and 34 will appear in an overlapped form. If we limit the depth value to a range from 0 to 1, the object 32 has the smallest depth value due to its closest position from the observation point 31, and the object 34 has the largest depth value due to its farthest position from the observation point 31. In a transparently rendering process, these three objects will be displayed. In a non-transparently rendering process, only the top object will be displayed, and the objects 33 and 34 situated under the top one will not be displayed. The objects 33 and 34 are also called "hidden surface", and the pixels included in the hidden surfaces are called "invalid pixel." As mentioned above, the method to improve the 3D computer graphic performance is to discard the hidden surfaces or the invalid pixels included in the hidden surfaces, and keep them away from the rendering process. Therefore, a lot of unnecessary memory access actions will be eliminated. In 3D computer graphics nowadays, every object is formed by at least one display list having its own characteristics, such as different textures. The display lists are formed by a plurality of display primitives, such as polygons. Besides, the plurality of display primitives are formed by pixels. Therefore, we can represent the video data of a display frame with a plurality of display lists.

Figure 1:
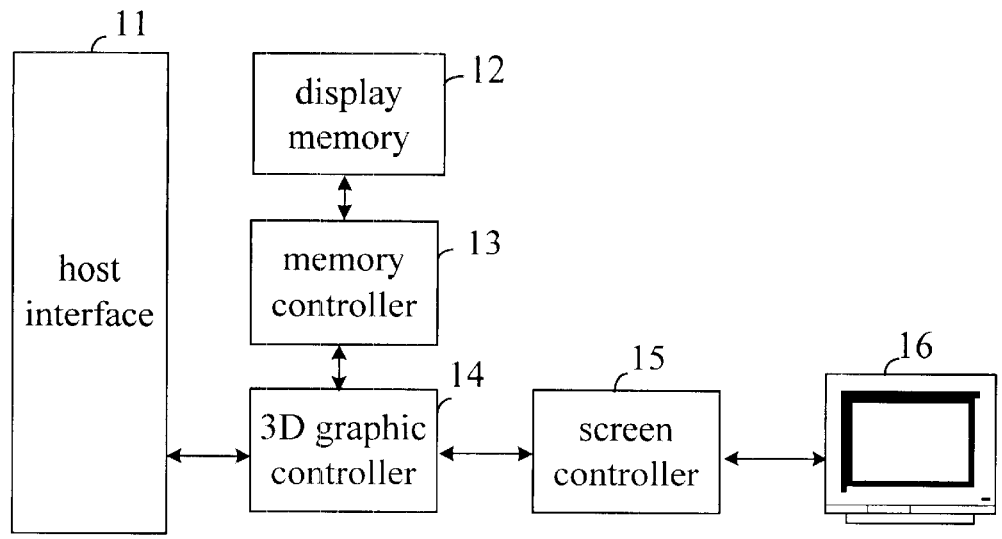
FIG. 1 is a structure diagram of a well-known 3D computer graphic display system.
Figure 4:
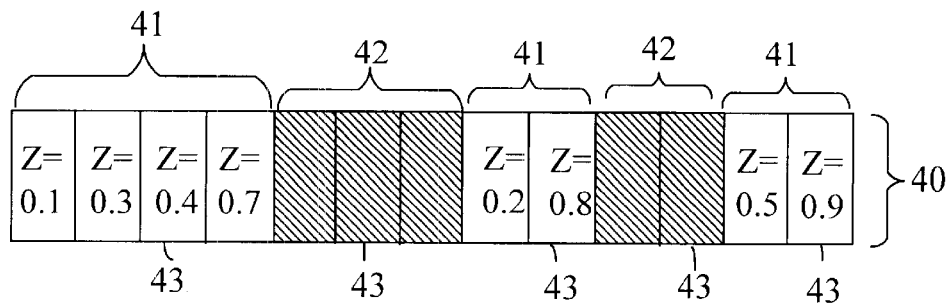
FIG. 4 is a schematic diagram of representing a display frame with a plurality of display lists according to the present invention.

FIG. 4 is a schematic diagram of representing a display frame with a plurality of display lists according to the present invention, wherein the plurality of display lists are divided into reordered regions 41 and static regions 42. The static regions 42 execute the above-mentioned transparently rendering process, and the reordered regions 41 execute the above-mentioned non-transparently rendering process. The 3D graphic controller 14 in FIG. 1 will receive the video data from the host interface 11 to determine if a transparently rendering process is executing.

Figure 5:
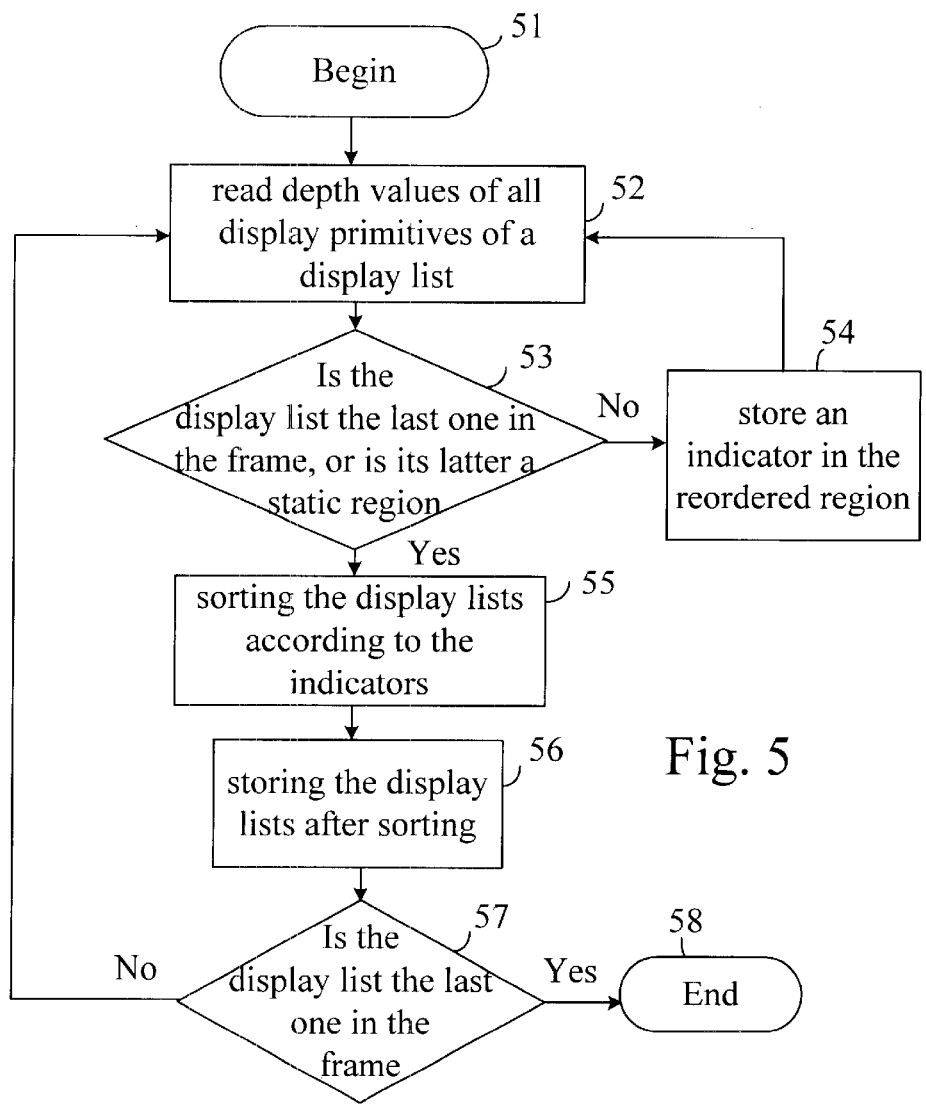
FIG. 5 shows a flow chart of a first preferred embodiment of the present invention.

FIG. 5 shows a flow chart of a first preferred embodiment of the present invention. In step 51, the flow of the present invention starts, that means that a rendering process is started. In step 52, the depth values of all display primitives of a display list are read. An indicator is computed to represent the depth values having been read. The indicator can be, for example, the average, minimum or maximum value of the depth values having been read. In step 53, determine if the display list being executed is the last one in the display frame or if the region after the display list is a static region. If the answer is no, step 54 is executed. In step 54, the indicator of the display list being executed is stored in the reordered region 54, and then step 52 is executed. If the answer of step 53 is yes, step 55 is then executed. In step 55, the plurality of display lists are sorted according to the indicators. The display lists with smaller indicators are arranged on the front end of the reordered region, and the display lists with larger indicators are arranged on the rear end of the reordered region. In step 56, the display lists which are sorted are stored. In step 57, check if the display list being executed is the last one in the display frame. If the answer is no, the flow repeats step 52. If the answer is yes, the flow ends, and a Z-buffer pre-test process is then executed.

Figure 2:
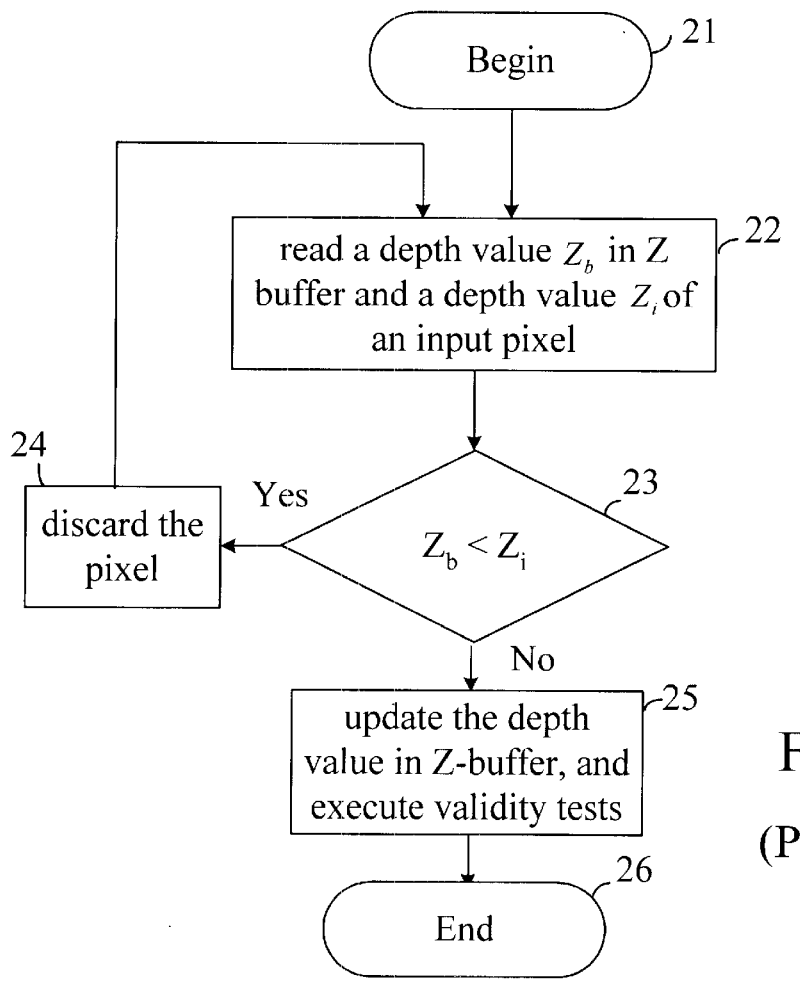
FIG. 2 is a flow chart of a well-known Z-buffer pre-test process.

The present invention sorts the display lists in the reordered region according to the indicator representing the depth values of all display primitives of one display list, and the display lists in the static region are kept in their original orders. The sorting method is to place the display list a smaller indicator, that means that the display list is positioned closer to the observation point 31, at the front end of the reordered region, and place the display list with the larger indicator, that means that the display list is positioned farther from the observation point 31, at the rear end of the reordered region. When the flow ends, the depth values of the pixels in the reordered region will be read from the front end to the rear end in the Z-buffer pre-test process. Because the display lists have been reordered in advance, the probability of updating the depth values in step 52 shown in FIG. 2 will be greatly reduced. In other words, a lot of unnecessary memory accesses will be discarded.

The flow in FIG. 5 uses one indicator to represent the depth values of all display primitives of one display list. Because the depth values of all display primitives of one display list are not always the same, the indicator would just approximate the depth values of all display primitives of one display list and still remain in error. The effect caused by the error is that the probability of unnecessary memory accesses is raised in the Z-buffer pre-test process, and therefore the system performance will be reduced. Another embodiment of the present invention is to represent the video data in the display frame 40 directly with a plurality of display primitives. Because each of the plurality of display primitives has its own depth value, it is unnecessary to compute an indicator as a parameter of depth values, and error caused by the difference between the indicator and depth value will be avoided.

Figure 6:
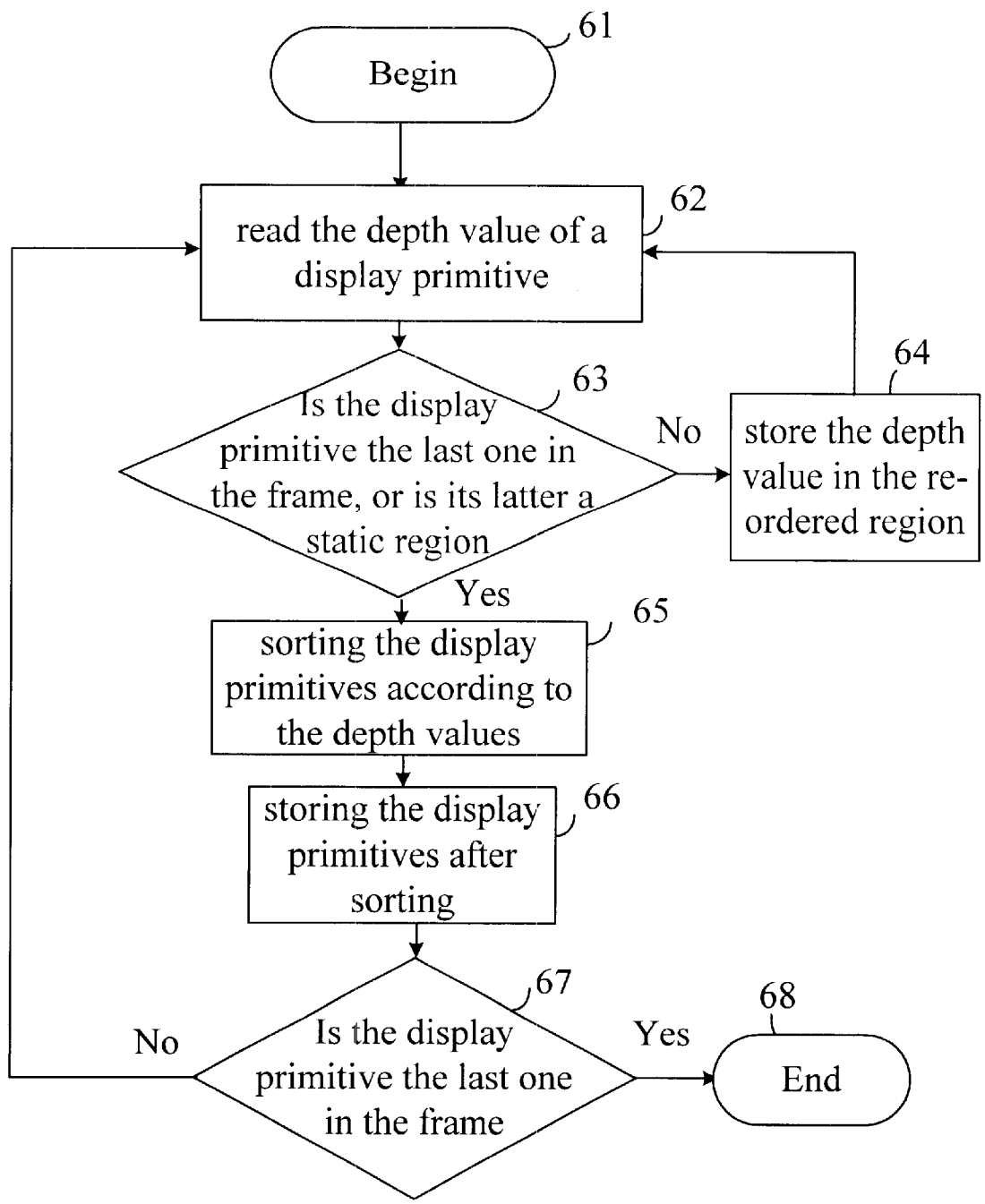
FIG. 6 shows a flow chart of a second preferred embodiment of the present invention.

FIG. 6 shows a flow chart of a second preferred embodiment of the present invention, wherein the present invention forms the video data in the display frame 40 directly with the plurality of display primitives. In step 61, the flow of the present invention starts, that means that a rendering process is started. In step 62, the depth value of one display primitive being executed is read. In step 63, determine if the display primitive being executed is the last one in the display frame or if the region after the display primitive is a static region. If the answer is no, the flow enters step 64. In step 64, the depth value of the display primitive being executed is stored in the reordered region 64, and the flow repeats step 62. If the answer of step 63 is yes, step 65 is executed. In step 65, the plurality of display primitives are sorted according to the depth values. The display primitives with smaller depth values are arranged at the front end of the reordered region, and the display primitives with larger depth values are arranged at the rear end of the reordered region. In step 66, the display primitives which are sorted are stored. In step 67, check if the display primitive being executed is the last one in the display frame. If the answer is no, the flow repeats step 62. If the answer is yes, the flow ends, and the Z-buffer pre-test process is then executed.

The present invention could be implemented by software or hardware, and there are no limits on that. When software, such as a software driver, is used to implement the present invention, the method of the present invention could be conducted by a CPU, and the display lists or display primitives which are sorted are transmitted to the 3D graphic controller 14 and display memory 12 through the host interface 11 shown in FIG. 1.

When hardware is used to implement the present invention, the method of the present invention could be embedded in the 3D graphic controller 14, which stores the sorting results in the display memory 12 later.

The above-described embodiments of the present invention are intended to be illustrated only. Numerous alternative embodiments may be devised by those skilled in the art without departing from the scope of the following claims.

What is claimed is:

1. A method for improving 3D computer graphic performance by pre-sorting, said method dividing a plurality of display lists representing a display frame into static regions and reordered regions according to whether a transparently rendering process is executed or not, said method comprising the following steps:

(a) reading depth values of all display primitives of a display list, and assigning an indicator to represent said depth values;

(b) checking if the display list is the last one in the display frame or if the region after the display list is a static region;

(c) if the answer of step (b) is no, storing the indicator in the reordered region, and entering step (a);

(d) if the answer of step (b) is yes, sorting the plurality of display lists according to their indicators, and the display lists after sorting being stored;

(e) checking if the display list is the last one in the display frame; and (f) if the answer of step (e) is no, entering step (a); otherwise, ending the steps.

2. The method of claim 1, after step (f), further comprising the step of executing a Z-buffer pre-test process.

3. The method of claim 1, wherein said indicator is one of the average, minimum and maximum values computed with the depth values of all display primitives of one display list.

4. A method for improving 3D computer graphic performance by pre-sorting, said method dividing a plurality of display primitives. representing a display frame into static regions and reordered regions according to whether a transparently rendering process is executed or not, said method comprising the following steps:

(a) reading a depth value of a display primitive;

(b) checking if the display primitive is the last one in the display frame or if the region after the display primitive is a static region;

(c) if the answer of step (b) is no, storing the depth value in the reordered region, and entering step (a);

(d) if the answer of step (b) is yes, sorting the plurality of display primitives according to the depth values, and storing the display primitives being sorted;

(e) checking if the display primitive is the last one in the display frame; and (f) if the answer of step (e) is no, entering step (a); otherwise, ending the steps.

5. The method of claim 4, after step (f), further comprising the step of executing a Z-buffer pre-test process.

\* \* \* \* \*